Jan. 17, 1933.  J. SATTERQUIST  1,894,326
UNLOADING APPARATUS
Filed April 13, 1931   4 Sheets-Sheet 1
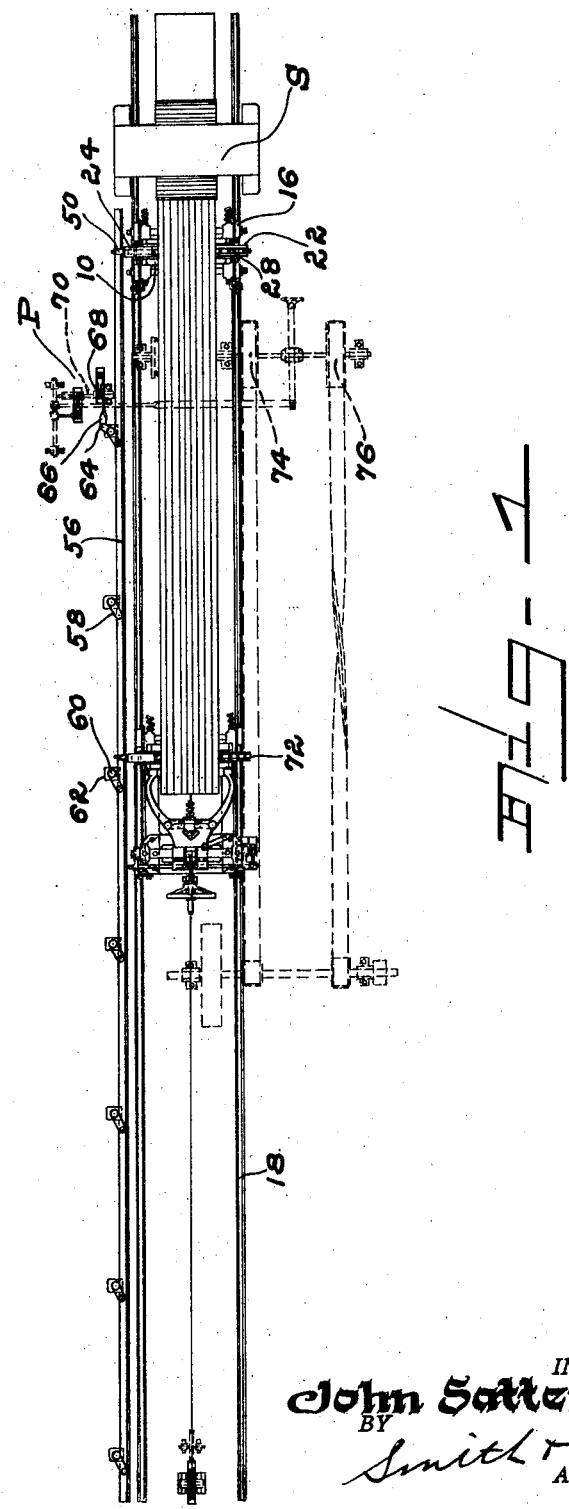
INVENTOR
John Satterquist
BY
Smith & Tuck
ATTORNEYS

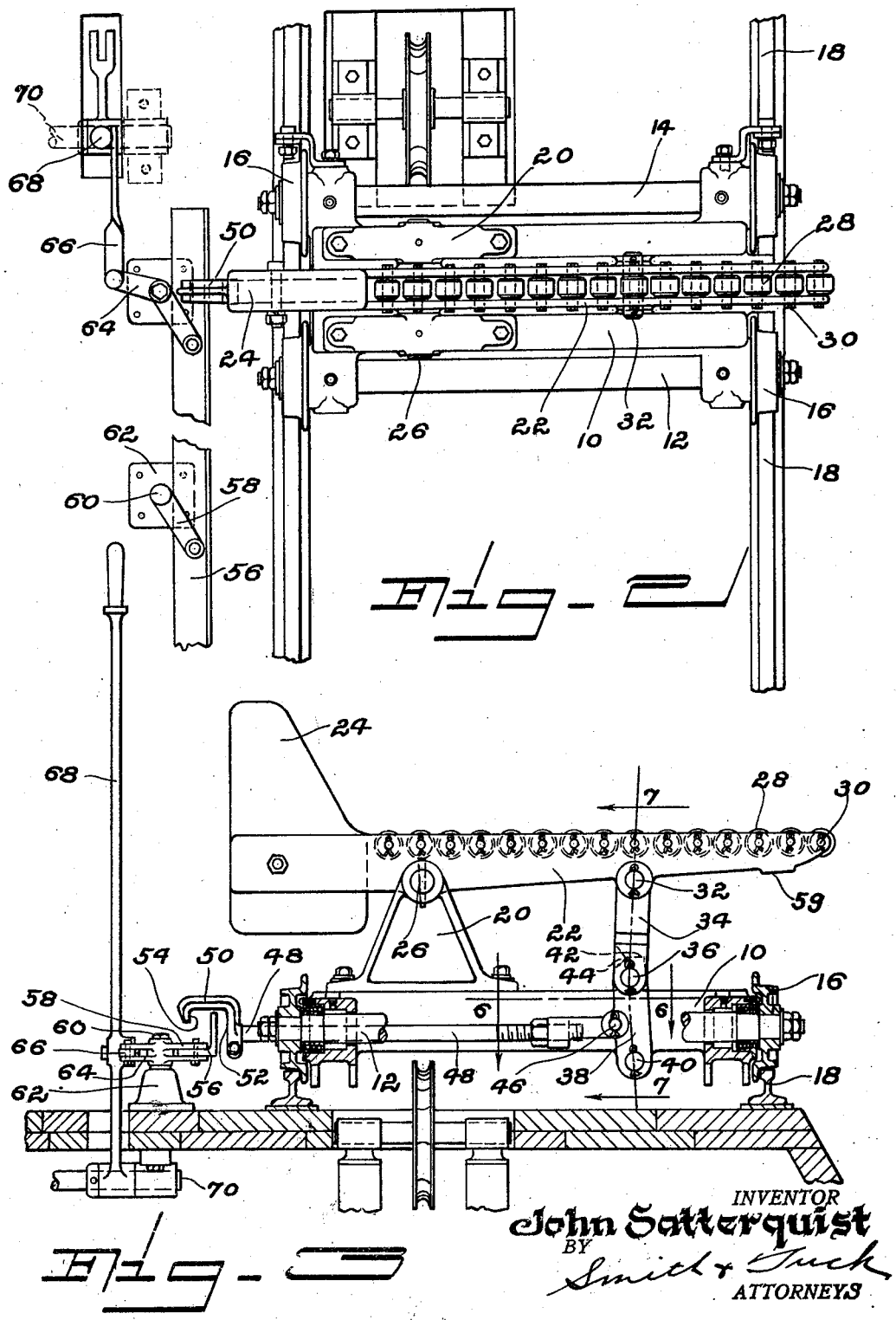

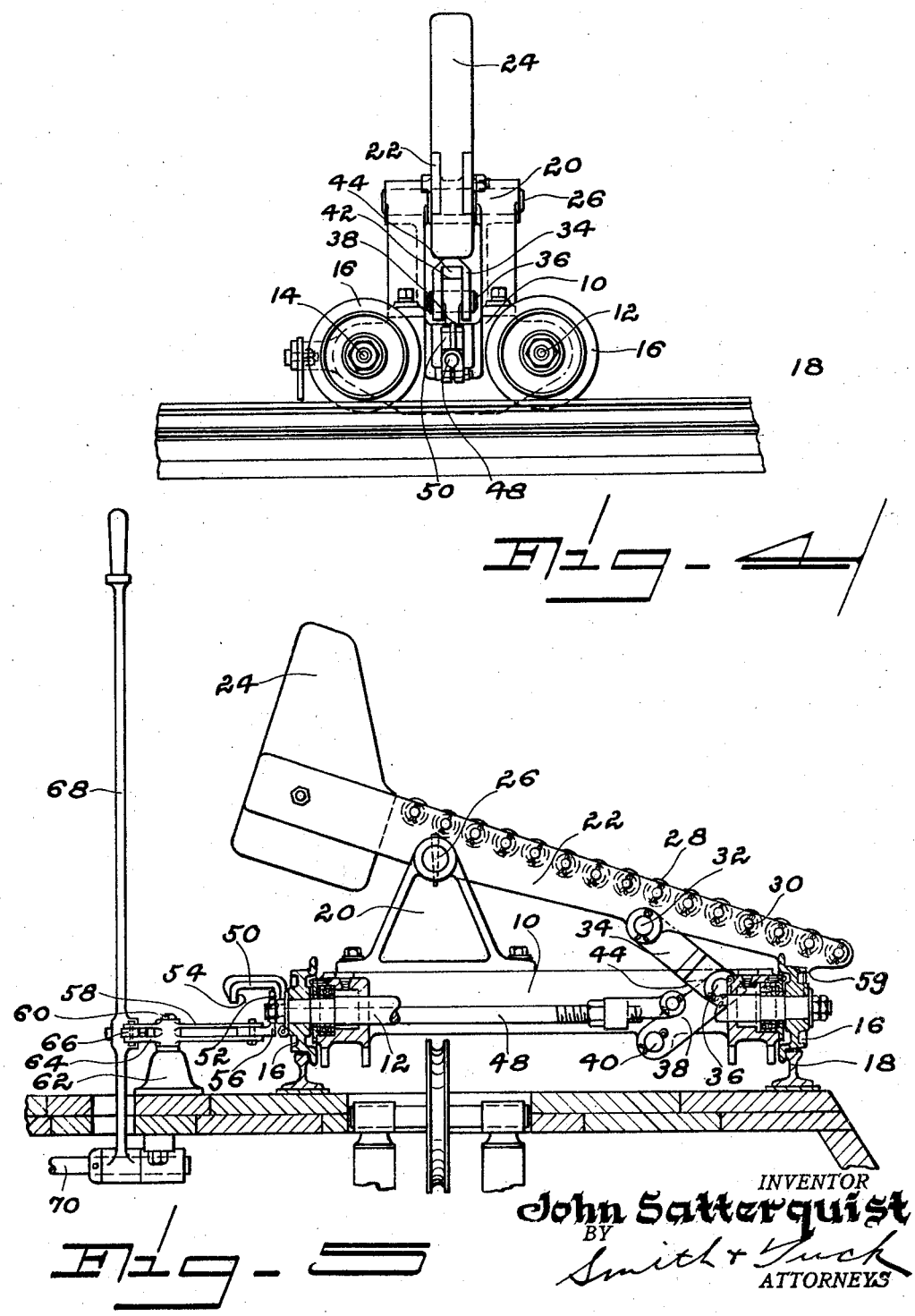

Jan. 17, 1933.　　　J. SATTERQUIST　　　1,894,326
UNLOADING APPARATUS
Filed April 13, 1931　　4 Sheets-Sheet 4
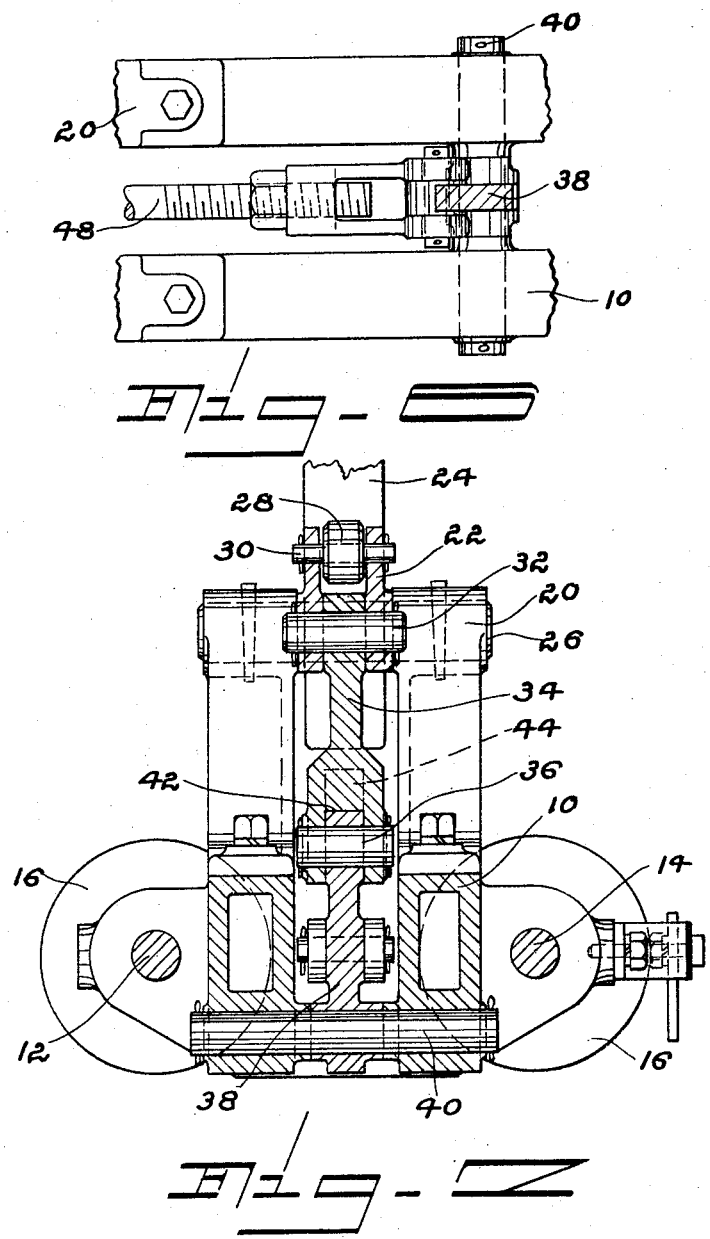

Patented Jan. 17, 1933

1,894,326

UNITED STATES PATENT OFFICE

JOHN SATTERQUIST, OF OLYMPIA, WASHINGTON, ASSIGNOR OF ONE-HALF TO MILL ENGINEERING AND SUPPLY COMPANY, OF SEATTLE, WASHINGTON, A CORPORATION OF WASHINGTON

UNLOADING APPARATUS

Application filed April 13, 1931. Serial No. 529,709.

My present invention relates to the art of saw mill machinery and more particularly to an unloading apparatus which is intended principally for handling a sawed log after it passes through a gangsaw. However, it is not intended in the following description to limit the use of this apparatus to handling lumber from a gangsaw as there are many other uses to which such a carriage might be put. For sake of clearness in description, however, it is believed preferable to describe the same in its association with a gangsaw.

In gangsaw operation considerable time is spent in passing the log through the saws and if reasonable output is to be obtained it is necessary that the logs pass through the saws one immediately following the other. This is usually accomplished through the use of automatic or semi-automatic feeding mechanism. It is therefore necessary that the carriage which takes the sawed log away be quickly moved to the position where it is desired to unload the carriage, to effect a quick unloading and return the entire carriage back to the saws so that it will be in position to engage the next log as it emerges from the saws. It is also very desirable in the interests of operating economy to have the carriage so arranged that one man can handle it and need not in any way assist in the unloading operation other than to trip the unloading apparatus.

Therefore the principal object of my present invention is to provide a log handling apparatus which can be operated very quickly.

A further object is to provide an apparatus of this character which does not require any manual labor as it is unloaded.

A still further object is to so construct the apparatus that it may be controlled from a fixed station and still may be unloaded at any desired point in its travel.

Other and more specific objects will be apparent from the following description taken in connection with the accompanying drawings, wherein Figure 1 is a top plan view showing my unloading device as installed with a gangsaw and illustrating the control mechanism employed in its operation.

Figure 2 is a fragmentary top plan view showing one of my unloading apparatuses near one end of its travel.

Figure 3 is an elevation of the same, certain parts being shown in section to better illustrate the details of construction.

Figure 4 is an end elevation taken from the control side of my device.

Figure 5 is a view similar to Figure 3 but showing my device in its tripped or unloading position.

Figure 6 is a fragmentary detailed view taken along the line 6—6 of Figure 3.

Figure 7 is a longitudinal sectional view in elevation taken along the line 7—7 of Figure 3.

Referring to the drawings throughout which like reference characters indicate like parts, numeral 10 designates the main frame of my device. This is adapted to be supported on two spaced axles 12 and 14 which are provided with suitable track engaging wheels 16 which in the form shown are adapted to engage ordinary steel rails 18. Pivotally secured to either an upward extension of frame 10 or as I have illustrated, separate support bearings 20, which in turn are secured to frame 10, is a substantial balanced log support member 22.

For ease in operation which will be more apparent later, I provide a log stop member or chock 24. This I prefer to have of rather massive construction so that it will tend to balance that part of member 22 which extends on the opposite side of the pivot 26. The upper or log engaging surface of member 22 may have any suitable face. However, it has been found to aid considerably in the operation of unloading if the log be supported on a plurality of rollers as indicated at 28 and which are journaled on pins 30. With this construction any tendency for the log to remain in repose due to frictional engagement, is overcome. Pivotally secured to the discharge side of support 22 as at 32 is a toggle link 34. This in turn is pivotally secured at 36 to the trip link 38. Trip link 38 is in turn pivotally secured at 40 to frame 10. The exact construction of these parts can best be understood in Figures 3, 5, 6 and 7. Links 34 and 38 provide a toggle support which is shown in its locked position in Figure 3. In this position pivot 36 is indicated as being to the left of a line joining pivots 32 and 40. It is necessary for successful locking, however, that the engaging surfaces at 42 be arranged to seat upon one another so as to prevent pivot 36 moving any further to the left, and it is then necessary that relief be provided as at 44 so as to enable the breaking of this joint when it is desired to trip the device.

Pivotally secured to the trip link at 46 is a trip rod 48. This is provided at its outer end with an overhanging hook arrangement 50 which has the two abutting surfaces 52 and 54. These two surfaces are adapted to engage a trip bar 56. When trip bar 56 is pressed against surface 52 the action is to move pivot 36 to the right. As soon as pivot 36 has passed a line joining pivots 32 and 40 the weight of member 22 and any dead load it may be supporting continues the downward movement of member 22 until the engaging pad 59 comes to rest on the carriage frame 10. This position is illustrated in Figure 5. When the log has been unloaded, bar 56 is moved to the left until it engages the abutting surface 54 and a continuation of the outward movement of bar 56 acting through the toggle mechanism restores support member 22 to the locked position as illustrated in Figure 3.

Now it is very essential that an operator standing at position P, as illustrated in Figure 1, be able to unload the carriage in any position along track 18. It must further be remembered that two such units as described must be used together. Sometimes, however, it is found more convenient to embody one of the unload devices with the carriage which grips the leading end of the log. This avoids the necessity for two extra axles. It must further be remembered that in saw mill operation the logs are of varying length and it has not been found practical to have any definite spacing of the carriages. In fact, at times it is necessary to use more than two carriages if the timber being handled is very long. It is under conditions such as this that it is very desirable to be able to operate the trip mechanism in a manner which will provide simultaneous operation of all the carriages used in the supporting of a single log. This I have been able to do very satisfactorily with the mechanism illustrated.

A long bar member 56 extends substantially the full length of trackage 18. It is then necessary to be able to control this bar or if the length of the track is unusually long, to have several such bars but with all of them arranged to operate as a single bar. In the illustrations, I have shown bar 56 as an angle which is pivotally supported at a number of points as by arms 58 which are pivotally supported at 60 from the fixed supports 62. It is believed apparent that if all arms 58 are of the same length bar 56 can be moved toward or away from track 18 and always remain parallel with the same. At one or more points arms 58 are provided with operating arms 64 which in turn are connected as by connecting bar 66 to the hand lever 68 which I have illustrated as pivotally supported on shaft 70.

It is believed apparent that any convenient means might be employed to operate the toggle lock. For instance, trip rod 48 might be operated by a fluid cylinder or by gearing from a source of power. Further, the log support member 22 might be directly supported by a cam system or even by a fluid cylinder.

Some suitable means must be provided for moving at least the outermost carriage 72. This is essential, first, in order to move the sawed log, after it leaves the gang saw feed rolls, to its desired position and second, to return the carriages to their position for engaging the next log as it passes through the saws. As illustrated in Figure 1 herein, carriage 72 is formed as part of the gripping mechanism. A cable secured to the carriage and passing over suitable sheaves at either end of the track provides the necessary movement. This cable may be suitably driven, as, for instance, by a reversing motor or a motor which is controlled and delivers its power to the cable through some suitable reversing means, as for instance, by the straight and crossed belt illustrated in Figure 1 and which are adapted to be suitably controlled by friction clutches at 74 and 76. In Figure 1 the saw equipment is indicated at S.

It is unnecessary to have a drive means for any of the carriages excepting the outer one as that carriage in returning to engage a new log must necessarily move the intermediate carriages back to their new position of use.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

What I claim is:

1. An unloading apparatus consisting of a frame disposed for longitudinal movement; a transverse log support member pivotally supported from said frame; horizontally disposed log supporting rollers on the upper surface of said member to maintain the latter and transversely thereof; a toggle link pivotally secured to said support member to maintain the latter in a horizontal position; a trip link pivotally supported from said frame and adapted to pivotally engage said toggle link in such a manner as to provide a toggle support for said log support member, and means adapted to operate said toggle support.

2. An unloading apparatus consisting of a frame disposed for longitudinal movement; a transverse log support member pivotally supported from said frame, a chock secured at one end of said log support member and adapted to counterbalance said member; horizontally disposed log supporting rollers on the upper surface of said member and disposed transversely thereof; a toggle link pivotally secured to said support member; a trip link pivotally supported from said frame and adapted to pivotally engage said toggle link in such a manner as to provide a toggle support for said log support member and maintain it in a horizontal position, and operating means adapted to operate said toggle support.

3. An unloading apparatus consisting of a frame disposed for longitudinal movement; a support bearing secured to said frame; a log support member pivotally supported near one end by said bearing; a chock secured to said end and adapted to counterbalance said log support member; a toggle link pivotally secured near the opposite end of said support member; a trip link pivotally supported from said frame and adapted to pivotally engage said toggle link in a manner to provide a toggle lock for said support member; a trip rod pivotally secured to said trip link, an overhanging hook secured to the free end of the trip rod and provided with inner and outer abutting surfaces; a trip bar, disposed parallel to the carriage movement, operatively disposed between said abutting surfaces; support means for said trip bar adapted to permit operative movement of said bar and means adapted to operate said bar.

4. An unloading apparatus consisting of a frame disposed for longitudinal movement; a support bearing secured to said frame; a log support member pivotally supported near one end by said bearing; log supporting rollers on the upper surface of said log support member and disposed transversely thereof; a toggle link pivotally secured near the opposite end of said support member; a trip link pivotally supported from said frame and adapted to pivotally engage said toggle link in a manner to provide a toggle lock for said support member; a trip rod pivotally secured to said trip link, an overhanging hook secured to the free end of the trip rod and provided with inner and outer abutting surfaces; a trip bar, disposed parallel to the carriage movement, operatively disposed between said abutting surfaces; support means for said trip bar adapted to permit operative movement of said bar and means adapted to operate said bar.

5. An unloading carriage consisting of a frame disposed for longitudinal movement; a support bearing secured to said frame; a log support member pivotally supported near one end by said bearing; a chock secured to said end and adapted to counterbalance said log support member; log supporting rollers on the upper surface of said log support members and disposed transversely thereof; a toggle link pivotally secured near the opposite end of said support member; a trip link pivotally supported from said frame and adapted to pivotally engage said toggle link in a manner to provide a toggle lock for said support member; a trip rod pivotally secured to said trip link, an overhanging hook secured to the free end of the trip rod and provided with inner and outer abutting surfaces; a trip bar disposed parallel to the carriage movement, operatively disposed between said abutting surfaces; support means for said trip bar adapted to permit operative movement of said bar and means adapted to operate said bar.

6. An unloading carriage consisting of a frame disposed for longitudinal movement; a track adapted to support said frame; a support bearing secured to said frame; a log support member pivotally supported near one end by said bearing; a toggle link pivotally secured near the opposite end of said support member; a trip link pivotally supported from said frame and adapted to pivotally engage said toggle link in a manner to provide a toggle lock for said support member; a trip rod pivotally secured to said trip link, an overhanging hook secured to the free end of the trip rod and provided with inner and outer abutting surfaces; a trip bar operatively disposed between said abutting surfaces and parallel to said track; support means for said trip bar disposed parallel to the carriage movement, adapted to permit operative movement of said bar and means adapted to operate said bar.

7. An unloading carriage consisting of a frame disposed for longitudinal movement; a support bearing secured to said frame; a log support member pivotally supported near one end by said bearing; a toggle link pivotally secured near the opposite end of said support member; a trip link pivotally supported from said frame and adapted to pivotally engage said toggle link in a manner to provide a toggle lock for said support member; a trip rod pivotally secured to said trip link, an overhanging hook secured to the free end of the trip rod and provided with inner and outer abutting surfaces; a trip bar operatively disposed between said abutting surfaces; support means for said trip bar, disposed parallel to the carriage movement, adapted to permit operative movement of said bar and means adapted to operate said bar.

8. An unloading carriage consisting of a frame disposed for longitudinal movement; a track adapted to support said frame; a support bearing secured to said frame; a log support member pivotally supported near one end by said bearing; a toggle link pivotally secured near the opposite end of said support member; a trip link pivotally supported from said frame and adapted to pivotally engage said toggle link in a manner to provide a toggle lock for said support member; a trip rod pivotally secured to said trip link, an overhanging hook secured to the free end of the trip rod and provided with inner and outer abutting surfaces; a trip bar operatively disposed between said abutting surfaces and parallel to said track; support means for said trip bar adapted to permit operative movement of said bar, means adapted to operate said bar and reversible translation means adapted to move said carriage along said track.

9. An unloading apparatus consisting of a frame disposed for longitudinal movement; a support bearing secured to said frame; a log support member pivotally supported near one end by said bearing; a chock secured to said end and adapted to counterbalance said log support member; a toggle link pivotally secured near the opposite end of said support member; a trip link pivotally supported from said frame and adapted to pivotally engage said toggle link in a manner to provide a toggle lock for said support member; a trip rod pivotally secured to said trip link; a trip bar disposed parallel to the carriage movement; means adapted to operatively connect the trip rod and the trip bar; support means for said trip bar and means adapted to operate said bar.

10. An unloading apparatus consisting of a frame having a support bearing a log support member pivotally supported near one end by said bearing and normally horizontally disposed; log supporting rollers on the upper surface of said log support member and disposed transversely thereof; a toggle link pivotally secured near the opposite end of said support member; a trip link pivotally supported from said frame and adapted to pivotally engage said toggle link in a manner to provide a toggle lock for said support member; a trip rod pivotally secured to said trip link, a trip bar operatively disposed for operating said trip rod; means for operatively connecting the trip rod and the trip bar; support means for said trip bar adapted to permit operative movement of said bar and means adapted to operate said bar.

11. An unloading carriage consisting of a frame; a support bearing secured to said frame; a log support member pivotally supported near one end by said bearing; a toggle link pivotally secured near the opposite end of said support member; a trip link pivotally supported from said frame and adapted to pivotally engage said toggle link in a manner to provide a toggle lock for said support member; a trip rod pivotally secured to said trip link; a trip bar; means for operatively connecting the trip rod and the trip bar; support means for said trip bar adapted to permit operative movement of said bar and means adapted to operate said bar.

In witness whereof, I hereunto subscribe my name this 23rd day of March A. D. 1931.

JOHN SATTERQUIST.